US012382290B2

(12) United States Patent
Coq et al.

(10) Patent No.: US 12,382,290 B2
(45) Date of Patent: Aug. 5, 2025

(54) DETECTING INFORMATION BREACH IN A COMPUTER SYSTEM

(71) Applicant: INTERNATIONAL BUSINESS MACHINES CORPORATION, Armonk, NY (US)

(72) Inventors: Marc Henri Coq, Hopewell Junction, NY (US); Samuel R. Connor, Apex, NC (US); Katharina Scharff, Leonberg (DE); Martin Rehm, Boeblingen (DE); Christine Axnix, Dettenhausen (DE); Hubert Harrer, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 18/366,150

(22) Filed: Aug. 7, 2023

(65) Prior Publication Data

US 2025/0024262 A1 Jan. 16, 2025

(51) Int. Cl.
*H04W 12/121* (2021.01)

(52) U.S. Cl.
CPC ................................. *H04W 12/121* (2021.01)

(58) Field of Classification Search
CPC .... H04W 12/121; H04L 63/1416; H04L 9/40; H04L 63/142
See application file for complete search history.

(56) References Cited

U.S. PATENT DOCUMENTS

| 9,390,257 | B2 | 7/2016 | Milford |
| 9,485,266 | B2 | 11/2016 | Baxley |
| 10,395,032 | B2 | 8/2019 | Keller |
| 10,467,444 | B2 | 11/2019 | Burchell |
| 10,554,526 | B2 | 2/2020 | Boubez |
| 10,935,587 | B2 | 3/2021 | McKinney |
| 11,468,273 | B2 | 10/2022 | Zhu |
| 2013/0340079 | A1* | 12/2013 | Gottlieb .............. H04L 63/1416 726/23 |
| 2014/0283062 | A1* | 9/2014 | Kamthe ............. H04L 63/1425 726/23 |

(Continued)

FOREIGN PATENT DOCUMENTS

| EP | 3201821 B1 | 12/2020 |
| EP | 3840319 A1 | 6/2021 |
| KR | 20180107789 A | 10/2018 |
| WO | 2023012784 A1 | 2/2023 |

OTHER PUBLICATIONS

Lu et al., "Machine-Learning PUF-based Detection of RF Anomalies in a Cluttered RF Environment", Nov. 2021, IEEE International Symposium on Technologies for Homeland Security, pp. 1-7 (Year: 2021).*

(Continued)

*Primary Examiner* — Kenneth W Chang
(74) *Attorney, Agent, or Firm* — Jared C. Chaney

(57) ABSTRACT

A method for detecting information breach in a computer system. The method comprises: detecting a radio frequency signal in an area of the computer system. A set of samples of the radio frequency signal may be input to a machine learning model. An output of the machine learning model may be received. The output indicates whether the detected radio frequency signal is anomalous. An alarm signal may be generated in case the detected radio frequency signal is predicted as an anomalous signal.

23 Claims, 8 Drawing Sheets

(56) References Cited

U.S. PATENT DOCUMENTS

| | | |
|---|---|---|
| 2015/0350862 A1 | 12/2015 | Baxley |
| 2019/0049548 A1* | 2/2019 | Miller .................. H04B 17/345 |
| 2020/0143279 A1 | 5/2020 | West |
| 2020/0252412 A1 | 8/2020 | Prasad Koppisetti |
| 2020/0379868 A1* | 12/2020 | Dherange .............. G06N 20/20 |
| 2021/0286800 A1* | 9/2021 | Zhang .................. G06F 16/2365 |
| 2021/0399407 A1 | 12/2021 | Keller, III |
| 2022/0225101 A1 | 7/2022 | Fellows |
| 2022/0417274 A1 | 12/2022 | Madanahalli |

OTHER PUBLICATIONS

Agrawal et al. "CASPER: An Efficient Approach to Detect Anomalous Code Execution from Unintended Electronic Device Emissions", Conference: Cyber Sensing, May 18, 2018, pp. 106300V-106300V (20 pages), vol. 10630, DOI: 10.1117/12.2500234.

International Searching Authority, "Notification of Transmittal of the International Search Report and the Written Opinion of the International Searching Authority, or Declaration," Patent Cooperation Treaty, Sep. 27, 2024, 12 pages, International Application No. PCT/ EP2024/068592.

Patents Act 1977:Search Report under Section 17(5), Application No. GB2310524.0, Nov. 30, 2023, 4 pages.

Albasir et al., "Unsupervised detection of security threats in cyberphysical system and IoT devices based on power fingerprints and RBM autoencoders," Journal of Surveillance, Security and Safety, 2021, 25 pages.

Coq et al., "Detecting Information Breach in a Computer System," UK Intellectual Property Office Application Number 2310524.0, Filed Jul. 10, 2023, 32 pages.

Bastille"Security for the Internet of Radios," bastille.net, downloaded Jul. 31, 2023, 8 pages.

* cited by examiner

| Case Number | Antenna Position | Noise Source | Number of Measurements |
|---|---|---|---|
| 1 | Diagonal, upper third of rack | Wireless transmitters A & B | 24 |
| 2 | Diagonal, upper third of rack | None (Ambient) | 667 |
| 3 | Vertical, upper third of rack | None (Ambient) | 162 |
| 4 | Horizontal, bottom third of rack | None (Ambient) | 210+187+887 |
| 5 | Horizontal, middle of rack | Wireless transmitter C | 93 |
| 6 | Horizontal, middle of rack | Wireless transmitter D | 70 |
| 7 | Horizontal, upper third of rack | Wireless transmitter B | 60 |
| | | Total | 2360 |
| | | Total Ambient | 2113 |
| | | Total Noise Source | 247 |

Fig. 7A

| Case Number | Antenna Position | Noise Source | Number of Measurements |
|---|---|---|---|
| 8 | Diagonal, middle of rack | None (Ambient) | 1933 |
| | | Total | 1933 |
| | | Total Ambient | 1933 |
| | | Total Noise Source | 0 |

Fig. 7B

DETECTING INFORMATION BREACH IN A COMPUTER SYSTEM

BACKGROUND

The present invention relates to the field of digital computer systems, and more specifically, to a method for detecting information breach in a computer system using radio frequency (RF) signals.

There are many cyber threats that arise with security and resiliency in today's environment where hackers can plant devices on an information technology (IT) environment or develop sophisticated software phishing algorithms to gather critical information. These types of attacks can go unnoticed for a long period of time and cause detrimental outages to companies and their IT infrastructures.

BRIEF SUMMARY

Various embodiments provide a method for detecting information breach in a computer system, computer program product, detection system, and a method of training a machine learning model to predict whether a radio frequency signal is anomalous as described by the subject matter of the independent claims. Advantageous embodiments are described in the dependent claims. Embodiments of the present invention can be freely combined with each other if they are not mutually exclusive.

In one aspect, the invention relates to a method for detecting information breach in a computer system. The method comprises: detecting a radio frequency signal in an area of the computer system; inputting a set of samples of the radio frequency signal to a machine learning model, the machine learning model being configured to predict whether a radio frequency signal is anomalous; receiving an output of the machine learning model, the output indicating whether the detected radio frequency signal is anomalous; generating an alarm signal in case the detected radio frequency signal is predicted as an anomalous signal.

In one aspect the invention relates to a computer program product comprising a computer-readable storage medium having computer-readable program code embodied therewith, the computer-readable program code configured to implement the method of the above embodiment.

In one aspect the invention relates to a detection system for detecting information breach in a computer system, the detection system comprising a machine learning model, the machine learning model being configured to predict whether a radio frequency signal is anomalous or not anomalous. The detection system is configured for: receiving a radio frequency signal in an area of the computer system; inputting a set of samples of the radio frequency signal to the machine learning model; receiving an output of the machine learning model, the output indicating whether the received radio frequency signal is anomalous; generating an alarm signal in case the received radio frequency signal is an anomalous signal.

In one aspect the invention relates to a method of training a machine learning model to predict whether a radio frequency signal is anomalous or not anomalous. The method comprises: creating a training dataset, the training dataset comprising entries, wherein the entry comprises a set of samples of a training radio frequency signal of the computer system and a label indicating whether the training radio frequency signal is anomalous or not; training the machine learning model using the training dataset.

In one aspect the invention relates to a computer program product comprising a computer-readable storage medium having computer-readable program code embodied therewith, the computer-readable program code configured to implement the training method.

BRIEF DESCRIPTION OF THE DRAWINGS

In the following embodiments of the invention are explained in greater detail, by way of example only, making reference to the drawings in which:

FIG. 7A is a table describing training data according to various embodiments of the present invention.

FIG. 7B is a table describing validation data according to various embodiments of the present invention.

DETAILED DESCRIPTION

Figure 1:
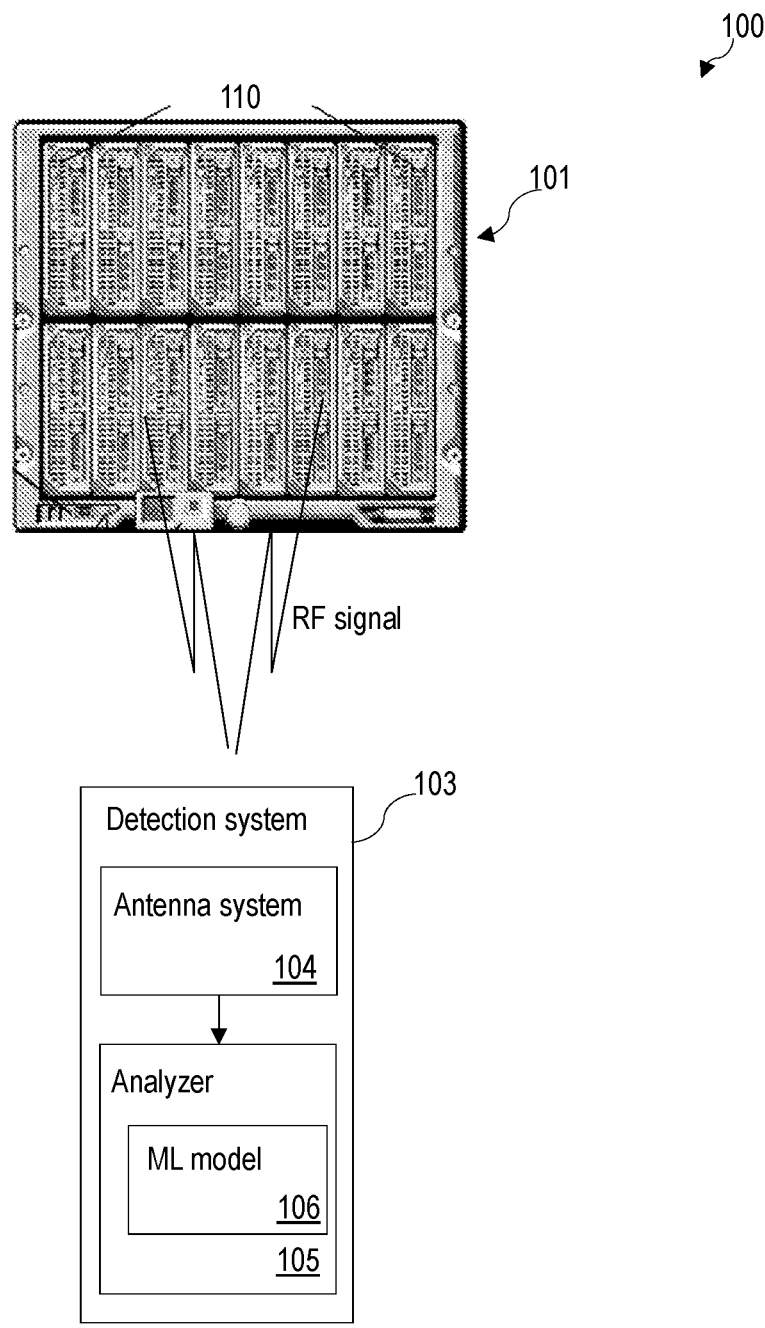
FIG. 1 is a block diagram of a computer system according to various embodiments of the present invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer system may be an IT system. The computer system may comprise one or more components (referred to as system component). The system component may comprise one or more electronic devices that enable data processing and/or data communication. The system component may, for example, comprise a computer or a networking device or a storage device. The computer may, for example, be a digital electronic computer including a central processing unit (CPU), a memory, Field Programmable Gate Arrays (FPGA), etc.

In one example, the computer system may be located in a room. The computer system may, for example, comprise computer racks in which multiple enclosures are mounted. The computer rack may provide mounted positions of the enclosures in the rack. The enclosures may, for example, include the system components of the computer system.

Ambient environment of the computer system and system components of the computer system may be the source of radio frequency signals. Indeed, the radio frequency signals could emit from anywhere in the computer system. For example, embedded integrated circuit (IC) devices, motherboards, printed circuit board (PCB), FPGA, and unsecured silicon may be the source of radio frequency signals. For example, radio waves may be emitted by antennas which are used to connect to a wireless network or to connect wirelessly to peripheral devices such as a cordless mouse. Also, a cable connected to the computer system may be a potential radiating antenna for RF noise. The RF signals may be detected in the area of the computer system. The area of the computer system may be an area surrounding the computer system. The area may for example be defined by a width, by a height and length of the area. The area may have a size smaller than a maximum size. The maximum size may be defined by a maximum width and/or maximum height and/or maximum length of the area. This may enable to control the distance between the detection system and the computer system to efficiently collect the radio frequency signals e.g., the area may be chosen such that the radio frequency signal detection may be a near-field measurement. The area may, for example, refer to a room where the computer system is located.

The detected radio frequency signal may be processed to obtain the set of samples. The number of samples may be, for example, higher than a predefined minimum number of samples. Each sample of the samples may represent a pair of (signal frequency, signal magnitude) or a pair of (signal time, signal magnitude). The machine learning model may be trained to receive a set of samples of an RF signal and to predict whether the RF signal of the set of samples represents an anomalous RF signal or represents a normal (or non-anomalous) RF signal. Thus, the present subject matter may provide an accurate and reliable means for detecting information breach and infringement using radio frequency. This may assure robust systems hardening. The present method may enable to compare expected radio frequency emissions profile for the computer system with real-time monitoring measurements to detect anomalies which could indicate the presence of a rogue transmitter in the computer system. For that, the machine learning model may be trained on the expected radio frequency spectrum profile and then used to classify new measurement data as either "same" or "different." An alert may be raised on the computer system if a "different" radio frequency spectrum is observed. This may enable to detect spurious activities in the computer system-whereas a latent circuit on the system environment can be activated and go undetected without knowing.

The present subject matter may provide different advantageous techniques to derive the set of samples from the detected radio frequency signal. For example, the detection system may comprise any one of a Swept-tuned Spectrum Analyzer (SA), a Real-time Spectrum Analyzer or a Network Analyzer which may be used to provide the set of samples.

In one example, the detection system may comprise a Swept-tuned Spectrum Analyzer (SA) that provides constituent frequencies and magnitudes of the detected RF signal, wherein the set of samples are the identified constituents. The Spectrum Analyzer may perform power versus frequency measurements by down converting the detected RF signal and sweeping it through the passband of a resolution bandwidth (RBW) filter. The RBW filter may be followed by a detector that calculates the amplitude at each frequency point in a selected span. Alternatively, a time-domain approach may be used to obtain the set of samples. For that, the detection system may, for example, comprise an oscilloscope to capture time domain data of the detected RF signal, to digitize the amplitudes with an analog-to-digital converter (ADC), and then to convert to frequency domain via the Fourier Transform.

The set of samples which are input to the machine learning model may be obtained from the detected radio frequency signal. For example, the set of samples may be the samples provided by the analyzer (e.g., SA) of the detection system. These samples provided by the analyzer may be referred to as initial samples. The present subject matter may provide the set of samples as the initial samples. Alternatively, the initial samples may be pre-processed in order to obtain the set of samples which are input to the machine learning model. For that, a mathematical preconditioner may be applied to the initial samples in order to obtain the set of samples. The mathematical preconditioner may, for example, be applied to the initial samples provided by the analyzer (e.g., SA) in order to obtain the set of samples which are used as input to the machine learning model. This may enable to emphasize the higher values in the spectrum. The mathematical preconditioner may be a moving average. Alternatively, the mathematical preconditioner may be performing a Fourier Transform of the spectrum followed by a high-pass filter to focus on rapid changes in the spectral values. The application of the Fourier transform may particularly be advantageous in case of multiple sub-models. It may enable to identify and compare the low-frequency changes and the high-frequency changes.

According to one example, the machine learning model may comprise multiple sub-models. Each sub-model may be configured to: receive a respective subset of the set of samples and predict whether the radio frequency signal is anomalous in the frequency range represented by the subset of samples. The overall frequency range covered by the detected radio frequency signal may be split into multiple frequency ranges which are associated with the sub-models respectively. Each subset of samples may represent a respective distinct frequency range of the detected radio frequency signal. The detected radio frequency signal may be predicted as anomalous if the radio frequency signal is predicted as anomalous in at least one of the frequency ranges associated with the multiple sub-models. For example, the frequency ranges may comprise two ranges, namely low and high frequency ranges. This may enable to compare the low-frequency changes (essentially this is the slow-changing amplitude of the entire dataset) and the high-frequency changes (when data changes value rapidly from point to point). For that, two separate sub-models may be trained for the low-frequency response and the high-frequency response and if a dataset classifies as an anomaly for either model, then it may be flagged as anomalous.

This example may further improve the accuracy of the present subject matter because it performs a focused search of anomalies depending on identified frequency ranges. Triggering the alert based only on part of the sub-models may enable a conservative approach to detect suspicious signals.

According to one example, the detected radio frequency signal may be predicted as anomalous if the radio frequency signal is predicted as anomalous in each range of the frequency ranges associated with the multiple sub-models. This may prevent false alarms because it relies on the anomalies detected by all sub-models and not only by part of the sub-models.

According to one example, the detection of the radio frequency signal may be performed by at least: detecting individual radio frequency signals which are provided by system components of the computer system respectively and combining the individual radio frequency signals to obtain the detected radio frequency signal. This example may enable component wise processing of the radio frequency signals. For example, some system components may not be used or have lower contribution while other components may have higher contributions. For that, the combination of the individual radio frequency signals may be a weighted sum, where the respective system components may be assigned different weights. The weights may, for example, be used to define contributions of the system components in the final decision of whether the combined RF signal is anomalous. The weights may have static values or time dependent values e.g., a computer that has some bug issues may be given a low weight or a zero weight until it is repaired. This may enable to have a low contribution of the individual radio frequency signals of this computer in the final decision until it is repaired. According to this example, the detection system may, for example, use two or more separate antennas to detect the individual radio frequency signals and use a network analyzer. The network analyzer may use phase information of the individual radio frequency signals to triangulate the signals and locate the system components that are the source of the individual radio frequency signals.

According to one example, the radio frequency signal may be a wireless radio frequency signal. For example, the detection system may comprise one or more antennas for detecting wireless RF signals in the area of the computer system. The antennas may, for example, be ultra-wideband (UWB) antennas.

According to one example, the generation of the alarm signal may comprise sending a notification about the detected anomalous radio frequency signal to a predefined contact person of the computer system. For example, the administrator of the computer system may be alerted in case the detected radio frequency signal is predicted as an anomalous signal.

According to one example, the method is repeated for each further detected radio frequency signal. That is, multiple radio frequency signals may be detected, the corresponding sets of samples may be input to the machine learning model in order to predict whether the multiple radio frequency signals are anomalous signals or not anomalous signals. This may enable to continuously monitor radio frequency signals of the computer system in order to determine if extraordinary transmissions are occurring. In one example, the alarm signal is generated in case the (current) detected radio frequency signal is predicted as anomalous and that a predefined minimum number of the detected radio frequency signals are predicted (so far) as anomalous signals.

According to one example, the set of samples which are input to the machine learning model may be time domain samples of the detected RF signal. Alternatively, the set of samples which are input to the machine learning model may be frequency domain samples of the detected radio frequency signal. This may enable a flexible implementation of the present example e.g., using different analyzers. Depending on the analyzer being used, a Fourier transform may be used to obtain the set of samples. For example, if the analyzer is a Spectrum Analyzer, the initial samples may be provided in frequency domain and the time domain samples may be obtained by an inverse Fourier transformation of the initial samples. If the samples are provided initially in time domain e.g., by an oscilloscope, then the frequency domain samples may be obtained by Fourier transformation of the initial samples.

According to one example, the machine learning model may be a classifier. In one example, the machine learning model is a Support Vector Machine (SVM) classifier. The Support Vector Machine classifier may be trained to recognize a baseline emissions profile and to highlight when an anomaly is present. For example, when a measurement sweep is taken with a Spectrum Analyzer, the measured profile may be classified as "same" or "different." If the measured profile is classified as "different," an alert may be sent to the system indicating that anomalous behaviour has been detected.

The machine learning model may be trained using a training dataset. The training dataset may comprise multiple entries. Each entry of the training dataset may represent a radio frequency signal which may be referred to a training radio frequency signal. The entry may comprise a set of samples of the training radio frequency signal and a label indicating whether the training radio frequency signal is anomalous or not anomalous. Each entry of the training dataset may comprise an array of data pairs (signal frequency, signal amplitude) which represents the set of samples, i.e., the sample may be provide as the pair (frequency, amplitude). The set of samples of each entry of the training dataset may be obtained as described herein e.g., using the analyzer. The training may be performed in order to minimize the error between the predictions and the labels. The training may, for example, be performed by evaluating a loss function that represents the error between the predictions and the labels. The training may be performed until the loss function converges. For example, the convergence criterion may be defined using a numerical value such as a tolerance value of 1e-3. The convergence criterion may be fulfilled if the difference of the loss function between two iterations is less than that tolerance value. The tolerance value may be changed if either the training takes too long (a looser criterion may lead to a shorter training time) or the results are not accurate enough. If this tolerance value can't be achieved, there may be a warning and the training may be repeated with a larger tolerance value.

The set of samples used as input of the machine learning model during the inference phase of the machine learning model may be obtained using the same method used to obtain the set of samples in each entry of the training dataset.

According to one example, the training radio frequency signals of the training dataset may be collected during manufacturing of the computer system, and/or during compliance testing of the computer system and/or in-situ after the computer system is installed. This example may enable to obtain the training radio frequency signals in different conditions of the computer system. This may provide a model that can detect anomalous signals reliably even if a latent system is introduced at any time of the lifetime of the computer system.

For example, if the computer system has a manageable number of configurations, the complete training set may be measured during compliance testing of the computer system. If there are an unmanageable number of configurations, each unit of the computer system may be measured as part of the manufacturing process. Another option may be to measure in-situ, after the computer system is installed at the customer location and iteratively after upgrades. The benefit to this approach may be that it may capture the spectrum contributions from the target ambient environment (e.g., a local FM radio station, or a nearby IT system with strong emissions).

According to one example, during the training phase, individual radio frequency signals at the system components may be detected, and the individual radio frequency signals may be combined to obtain the training radio frequency signal. The combining of the individual radio frequency signals may comprise averaging or summing the individual radio frequency signals after aligning the individual radio frequency signals in phase. For example, the frequency spectrum of various system components and the ambient environment may be characterized independently and then an aggregate expected emissions profile may be created by summing the individual contributions. Summing spectral magnitudes may assume phase alignment between transmission sources.

According to one example, the training radio frequency signals of the training dataset may be collected using different system configurations of the computer system. The system configuration of the computer system comprises at least one of: a workload level of the computer system, a signal to noise ratio, SNR, level indicating a noise contribution of a noise source of the computer system, or a predefined orientation of an antenna that detects the radio frequency signals. The workload level may, for example, indicate application workloads running on a logical partition (LPAR) of the computer system. The system configuration may further indicate the number of workloads running different applications.

According to one example, the training dataset may be updated by adding entries and/or deleting entries of the training dataset and the machine learning model may be retrained using the updated training dataset. This may enable to adjust the expectation when the computer system is modified e.g., by upgrades, expansions, adds, or removals.

According to one example, the update of the training dataset and the retraining may be performed in response to at least one of: a change in a configuration of the computer system and/or in an operation of the computer system or a validity time period is lapsed.

According to one example, the training may comprise for each entry of the training dataset: receiving by the machine learning model a set of samples of the training radio frequency signal, and predicting by the machine learning model whether the training radio frequency signal is anomalous, wherein the training may be performed to minimize the error between the predictions and the labels associated with the training radio frequency signals.

According to one example, the training may comprise for each entry of the training dataset and for each sub-model: receive at the sub-model a respective subset of a set of samples of the training reference signal, the subset of samples representing a respective frequency range of the training radio frequency signal, and predict by the sub-model whether the training radio frequency signal is anomalous or not anomalous in that frequency range, wherein the training radio frequency signal is predicted as anomalous if the training radio frequency signal is predicted as anomalous in at least one of the frequency ranges associated with the multiple sub-models, wherein the training may be performed to minimize the error between the predictions and the labels associated with the training radio frequency signals.

According to one example, the training radio frequency signal may be obtained by at least: detecting a radio frequency signal in an area of the computer system and providing the training radio frequency signal as the detected radio frequency signal, or applying a mathematical preconditioner to the detected radio frequency signal to obtain the training radio frequency signal. The detected radio frequency signal may be represented by the initial samples provided e.g., by the analyzer of the detection system. The mathematical preconditioner may be applied to the initial samples in order to obtain the set of samples which are used as input to the machine learning model. The mathematical preconditioner may be a moving average. Examples of moving average may be the 1-norm divided by the number of samples in the moving window (start with 3 or 5 for the window size). If the 1-norm does not give different results, the 2-norm and then 3-norm may be used. This may enable to determine if weighting the higher values yields a different sensitivity to changes in the peaks. Alternatively, the mathematical preconditioner may take a Fourier Transform of the initial samples and then use a high-pass filter to focus on rapid changes in the spectral values in order to obtain the set of samples of the training RF signal. The mathematical preconditioner may enable to emphasize the higher peak values so that the baseline/noise floor values are de-emphasized. This may be advantageous because the Fourier Transform of a dataset may provide a view of the periodicity of the data-how much energy is in slower changing features versus faster changing features.

FIG. 1 is a diagram of a monitoring system according to various embodiments of the present invention. The monitoring system 100 comprises a computer system 101 and a detection system 103. The detection system 103 may be configured to detect and process RF signals which are emitted from the computer system 101. The detection system 103 may comprise an antenna system 104 that is configured to detect the RF signals. The detected RF signal may be processed by an analyzer 105 of the detection system 103 in order to obtain a set of samples. The analyzer 105 may comprise a trained machine learning model 106. The machine learning model 106 is configured to predict whether a radio frequency signal represented by the set of samples is anomalous or not anomalous.

As shown in FIG. 1, the computer system 101 may comprise one or more racks. The rack may be configured to hold computer servers or networking equipment 110, by means of shelves or mounting plates.

In one example implementation, the analyzer 105 may comprise a Spectrum Analyzer (SA) or a Vector Network Analyzer (VNA) but it is not limited to. In one example implementation, the antenna system 104 may comprise, but it is not limited to, a UWB antenna which is configured to detect the RF signals in the frequency range 600 MHz to 6 GHz e.g., the antenna may have a size of 33×7 cm.

The detection system 103 may thus enable to collect RF spectrum data from Electromagnetic compatibility (EMC) emitted signals on system under operations, analyzing data continuously via a precise classification model and detect deviations for intrusions by comparing with a characterized baseline based on certain workloads by looking at narrow band peaks conditions. This may be performed by looking at electric field data amplitude versus frequency to detect anomalies in emissions.

Figure 2:
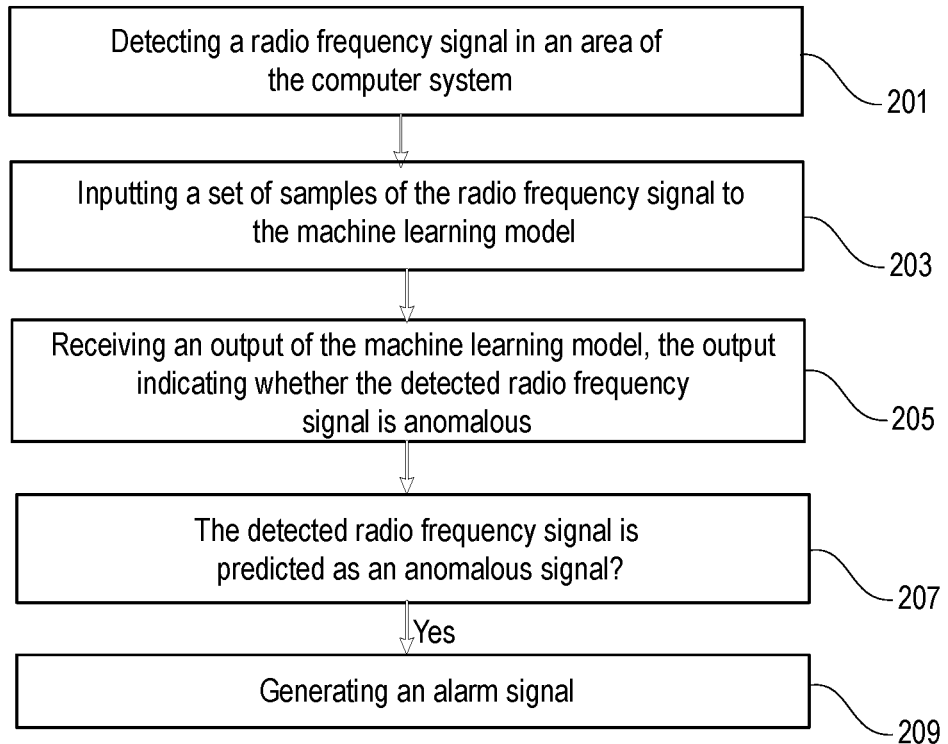
FIG. 2 is a flowchart of a method for detecting information breach in a computer system according to various embodiments of the present invention.

FIG. 2 is a flowchart of a method for detecting information breach in a computer system according to various embodiments of the present invention. For the purpose of explanation, the method described in FIG. 2 may be implemented in the system illustrated in FIG. 1, but is not limited to this implementation. For example, the method of FIG. 2 may be performed by the detection system 103 using the machine learning model 106.

A radio frequency signal may be detected in step 201 in an area of the computer system. A set of samples of the radio frequency signal may be input in step 203 to the machine learning model. An output of the machine learning model may be received in step 205. The output indicates whether the detected radio frequency signal is anomalous or not anomalous. It may be determined in step 207 whether the detected radio frequency signal is predicted as an anomalous signal. In case the detected radio frequency signal is predicted as an anomalous signal, an alarm signal may be generated in step 209.

In one example, steps 203 to 209 may be performed automatically in response to detecting the radio frequency signal.

In one example, the method of FIG. 2 may be repeated for each further detected radio frequency signal. This may enable a continuous monitoring of the computer system.

Figure 3:
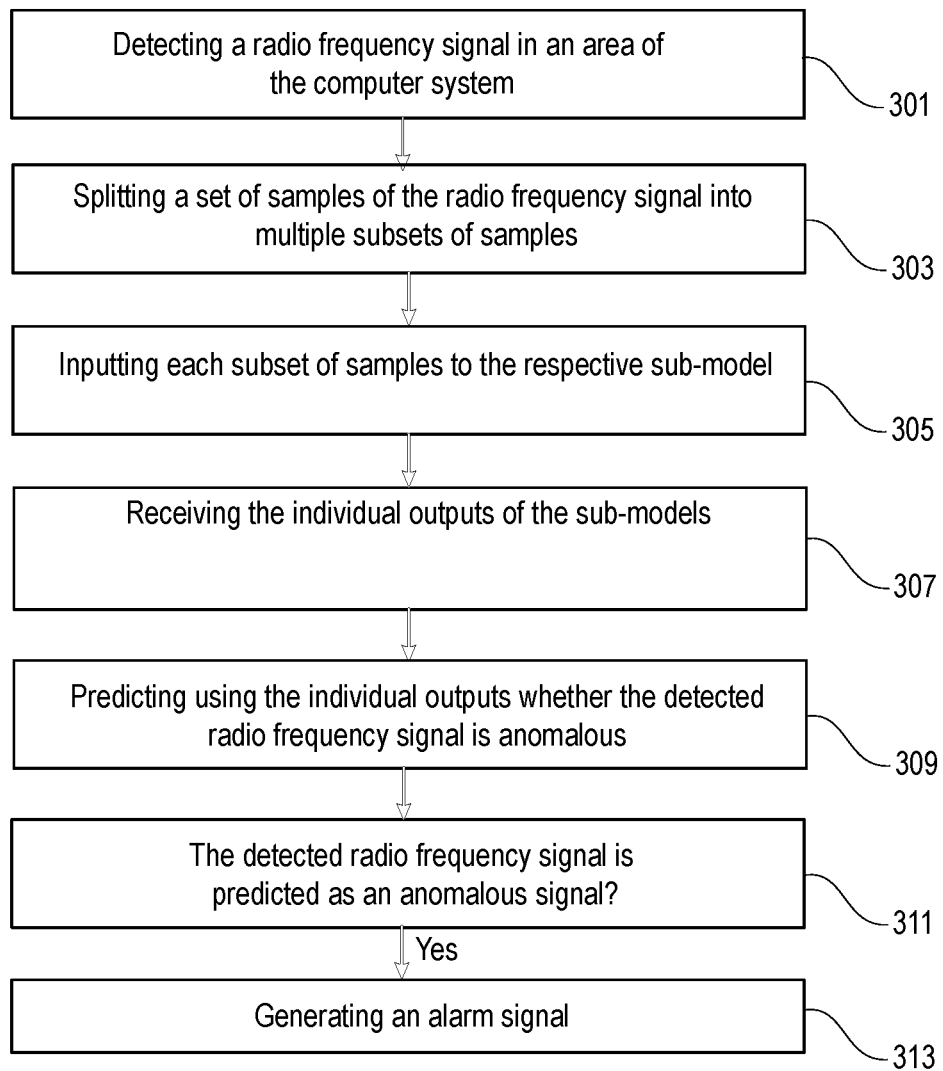
FIG. 3 is a flowchart of a method for detecting information breach in a computer system according to various embodiments of the present invention.

FIG. 3 is a flowchart of a method for detecting information breach in a computer system according to various embodiments of the present invention. For the purpose of explanation, the method described in FIG. 3 may be implemented in the system illustrated in FIG. 1, but is not limited to this implementation. For example, the method of FIG. 3 may be performed by the detection system 103. In this example, the machine learning model 106 may comprise multiple sub-models.

A radio frequency signal may be detected in step 301 in an area of the computer system. The set of samples may be split in step 303 into multiple subsets of samples each being associated with the respective sub-model. Each subset of samples represents a distinct frequency range of the detected radio frequency signal. Each subset of samples may be input in step 305 to the respective sub-model. An individual output may be received from each sub-model in step 307. The individual output of a given sub-model indicates whether the detected radio frequency signal is anomalous or not anomalous in the frequency range associated with the given sub-model. It may be predicted in step 309 using the individual outputs whether the radio frequency signal is anomalous or not anomalous. For example, if all individual outputs indicate anomaly, then the detected radio frequency signal is predicted as anomalous. Alternatively, if one or more individual outputs indicate anomaly, then the detected radio frequency signal is predicted as anomalous.

It may be determined in step 311 whether the detected radio frequency signal is predicted as an anomalous signal. In case the detected radio frequency signal is predicted as an anomalous signal, an alarm signal may be generated in step 313.

In one example, steps 303 to 313 may be performed automatically in response to detecting the radio frequency signal.

In one example, the method of FIG. 3 may be repeated for each further detected radio frequency signal. This may enable a continuous monitoring of the computer system.

Figure 4:
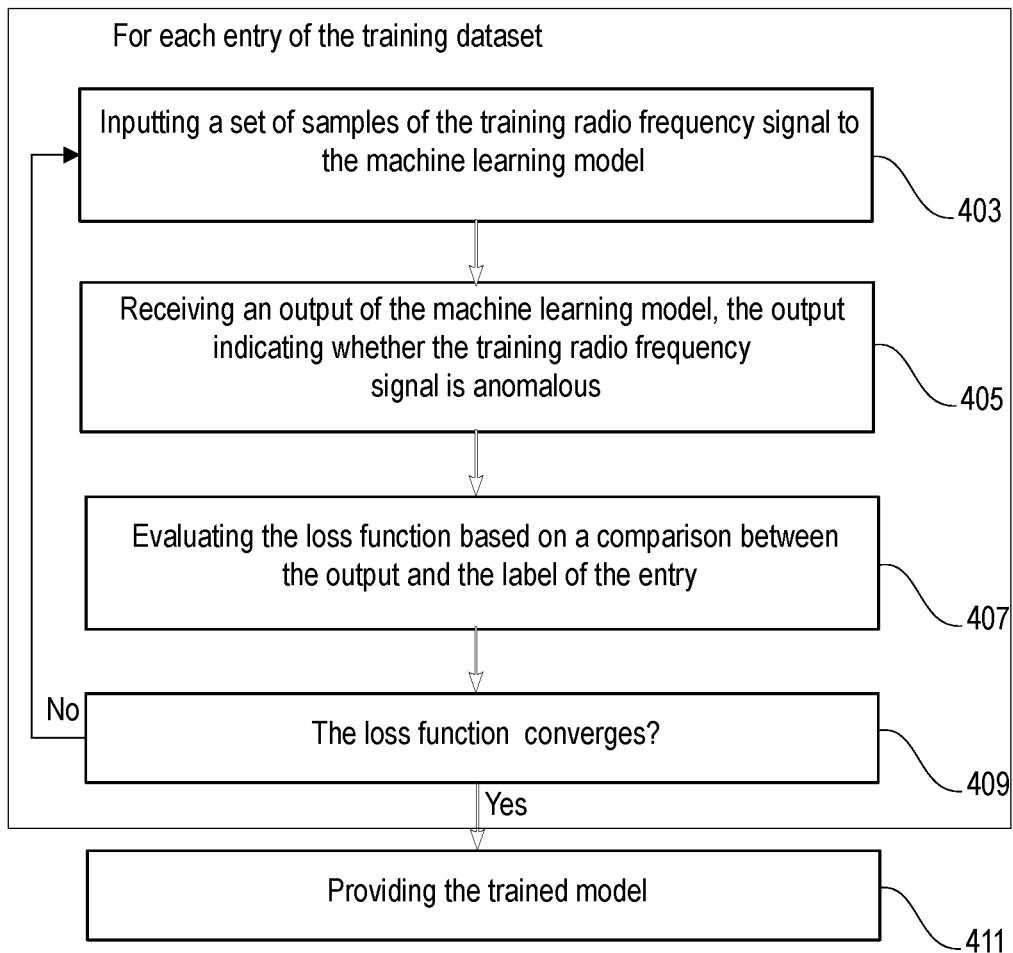
FIG. 4 is a flowchart of a method for training a machine learning model to predict anomalous radio frequency signals according to various embodiments of the present invention.
Figure 8:
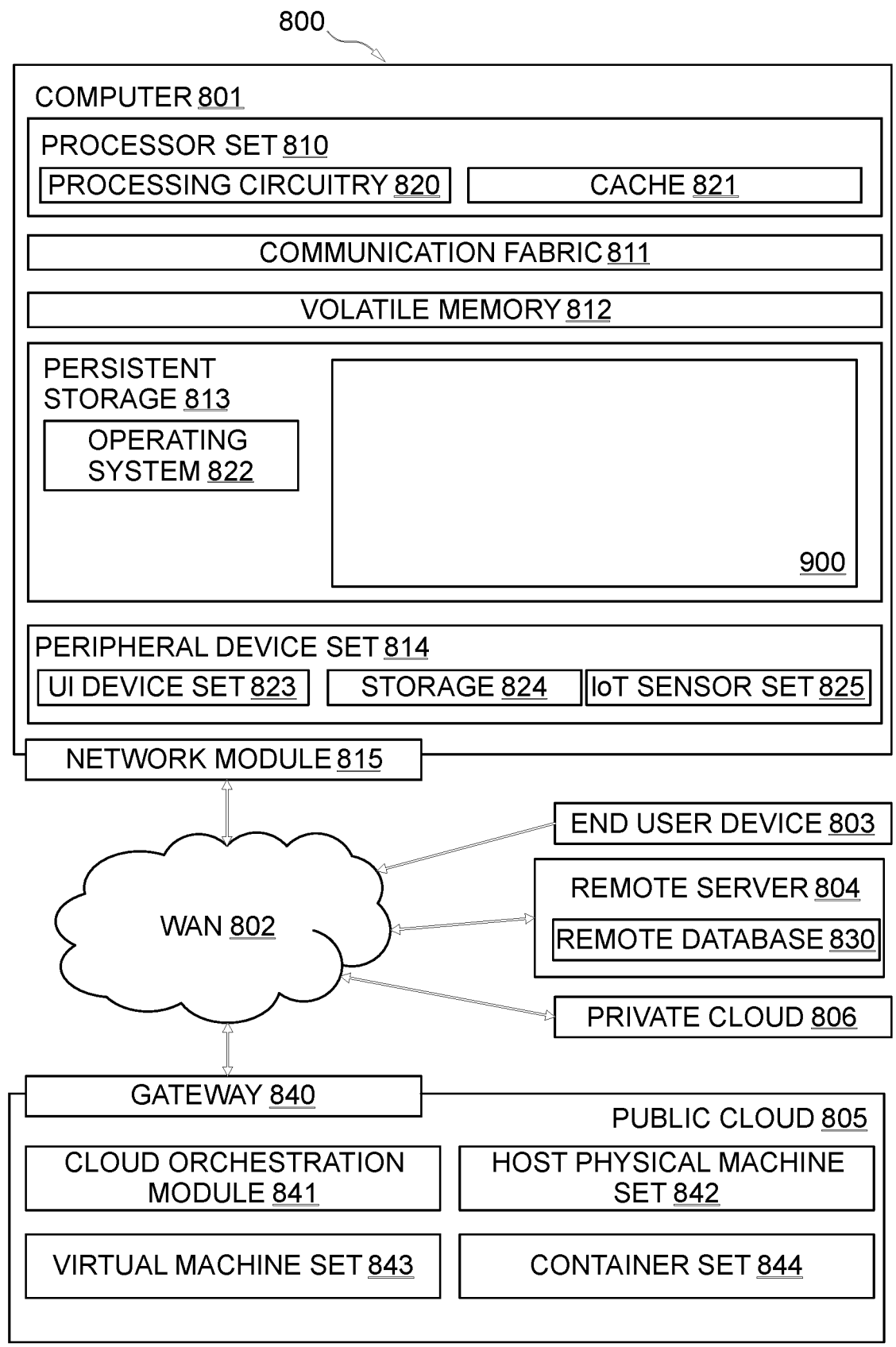
FIG. 8 is a computing environment according to various embodiments of the present invention.

FIG. 4 is a flowchart of a method for training a machine learning model such as the model 106 of FIG. 1 according to various embodiments of the present invention. The training may, for example, be performed by a system as described with reference to FIG. 8.

For each entry of a training dataset steps 403 to 409 may be performed. The training dataset comprises entries, wherein each entry comprises a set of samples of a training radio frequency signal of the computer system and a label indicating whether the training radio frequency signal is anomalous. The machine learning model may receive in step 403 a set of samples of the training radio frequency signal of the entry and predict in step 405 whether the training radio frequency signal is anomalous. A loss function may be evaluated in step 407 based on a comparison between the prediction and the label of the entry. It may be determined in step 409 whether the loss function converges. If so, the trained model may be provided in step 411; otherwise, learnable parameters or weights of the machine learning model may be adapted and steps 403 to 409 may be repeated for the next entry.

In one example, steps 403 to 411 may be repeated if the training dataset is updated in order to retrain the machine learning model. The update of the training dataset may be performed by adding and/or deleting entries of the training dataset. In one example, the training dataset may be updated if any one of the following occurs: a change in a configuration of the computer system and/or in an operation of the computer system, or a validity time period is lapsed.

Figure 5:
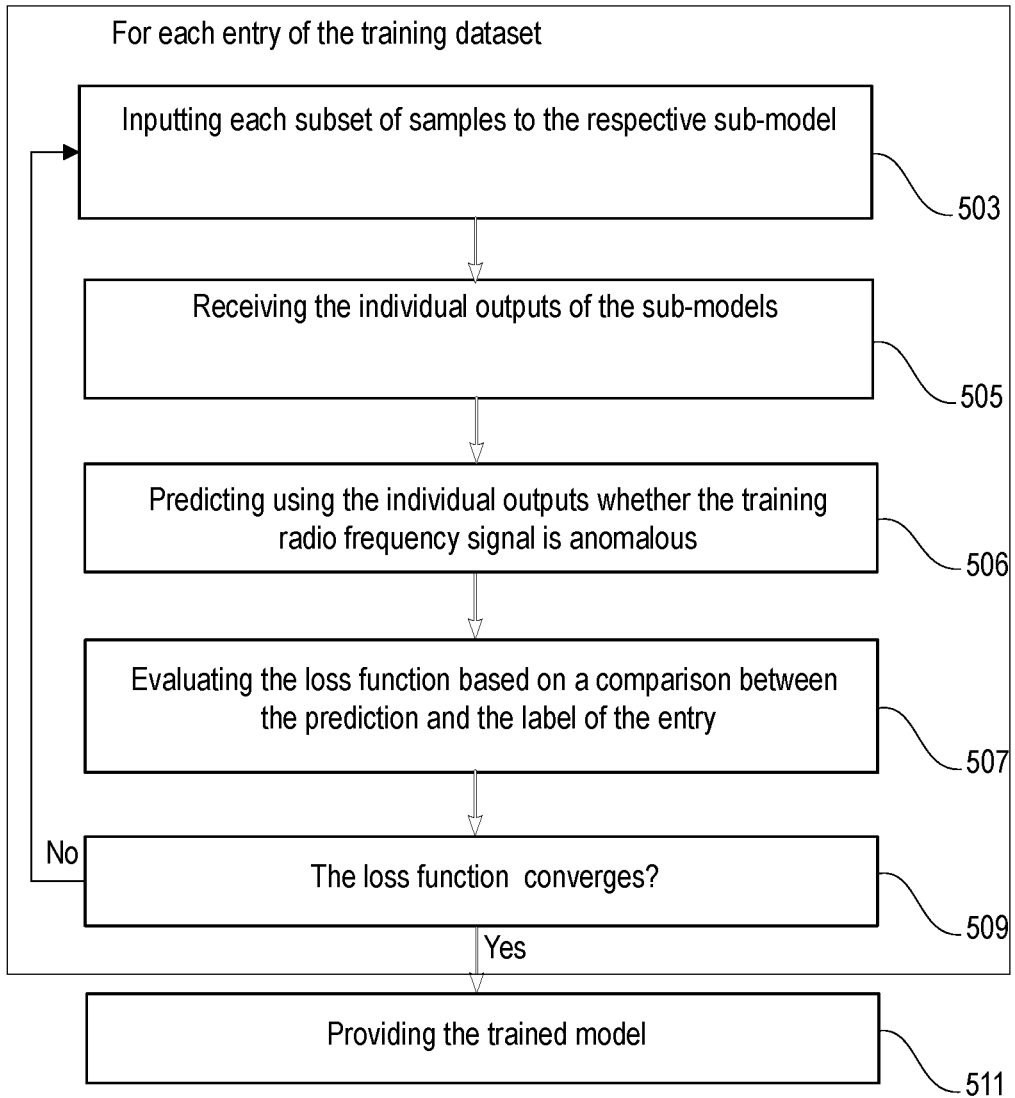
FIG. 5 is a flowchart of a method for training a machine learning model to predict anomalous radio frequency signals in different frequency ranges according to various embodiments of the present invention.

FIG. 5 is a flowchart of a method for training a machine learning model such as the model 106 of FIG. 1 according to various embodiments of the present invention. In this example, the machine learning model 106 may comprise multiple sub-models. The training may, for example, be performed by a system as described with reference to FIG. 8.

For each entry of a training dataset steps 503 to 509 may be performed. The training dataset comprises entries, wherein each entry comprises a set of samples of a training radio frequency signal of the computer system and a label indicating whether the training radio frequency signal is anomalous.

Each sub-model may receive in step 503 its respective subset of samples of the training radio frequency signal of the entry and predict in step 505 whether the training radio frequency signal is anomalous in the frequency range associated with the sub-model. The individual predictions may be used to predict in step 506 whether the training radio frequency signal is anomalous. A loss function may be evaluated in step 507 based on a comparison between the prediction of step 506 and the label of the entry. It may be determined in step 509 whether the loss function converges. If so, the trained model may be provided in step 511; otherwise, learnable parameters or weights of the sub-models may be adapted and steps 503 to 509 may be repeated for the next entry.

In one example, steps 503 to 511 may be repeated if the training dataset is updated in order to retrain the machine learning model. The update of the training dataset may be performed by adding and/or deleting entries of the training dataset. In one example, the training dataset may be updated if any one of the following occurs: a change in a configuration of the computer system and/or in an operation of the computer system, or a validity time period is lapsed.

Figure 6:
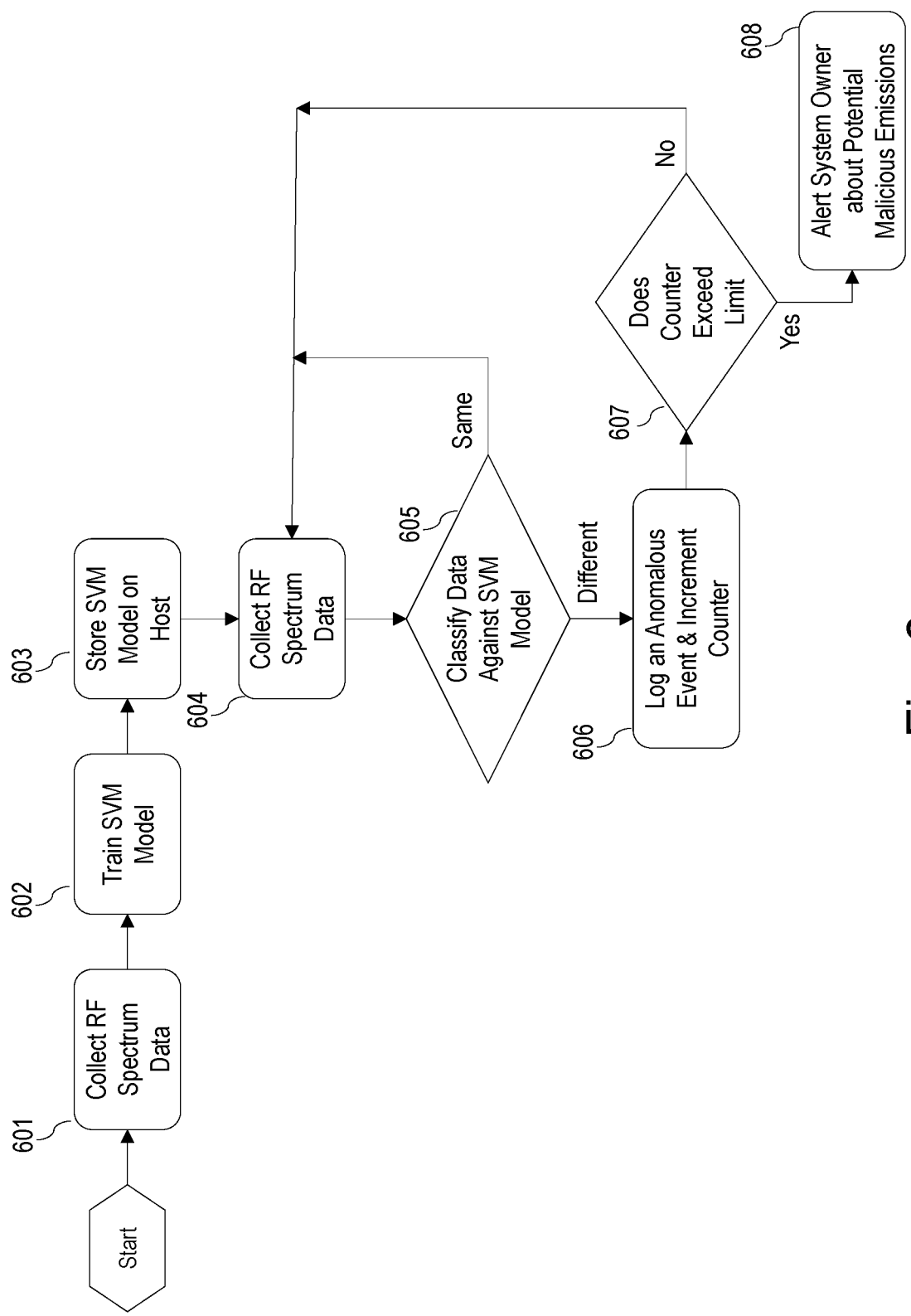
FIG. 6 is a flowchart of a method for detecting information breach in a computer system according to various embodiments of the present invention.

FIG. 6 is a flowchart of a method for detecting information breach in a computer system according to various embodiments of the present invention.

The RF spectrum data may be collected in step 601. An SVM model may be trained using the collected RF spectrum data. The SVM model may be trained in step 602 to predict whether a RF signal is anomalous or not anomalous. The trained SVM model may be stored in step 603 in a host computer. RF spectrum data may be collected in step 604. The collected data may be classified using the trained SVM model. In case (step 605) the collected data is classified as same (i.e., not anomalous) a baseline RF data that is enabled by the SVM model, the method may go back to step 604. In case (step 605) the collected data is classified as different (i.e., anomalous), a log entry may be created in step 606 to log an anomalous event and increment a counter of the anomalous events. In case (step 607) the counter exceeds a limit, the owner of the system may be alerted in step 608 about potential malicious emissions. In case (step 607) the counter does not exceed the limit, the method may go back to step 604.

FIG. 7A shows a table 700 summarizing system configurations of the computer system which are used to collect an example training dataset for training the machine learning model according to various embodiments of the present invention. The system configuration may be defined by a position or orientation 702 of the antenna being used to detect RF signals and the type of noise source 703 being used with the computer system. The system configurations are named in column 701 of the table 700. For example, the system configuration of the first row of the table 700 is defined by a diagonal position of the antenna and noise sources which are wireless transmitters. In this system configuration 24 measurements or entries of the training dataset are performed or created.

FIG. 7B shows a table 720 summarizing a system configuration of the computer system which is used to collect an example dataset for validating the machine learning model according to various embodiments of the present invention. The system configuration of the table 720 is defined by a diagonal position of the antenna and absence of noise sources. In this system configuration 1933 entries of the dataset are created.

The present subject matter may comprise the following clauses.

Clause 1. A method for detecting information breach in a computer system, the method comprising: detecting a radio frequency signal in an area of the computer system; inputting a set of samples of the radio frequency signal to a machine learning model, the machine learning model being configured to predict whether a radio frequency signal is anomalous; receiving an output of the machine learning model, the output indicating whether the detected radio frequency signal is anomalous; generating an alarm signal in case the detected radio frequency signal is predicted as an anomalous signal.

Clause 2. The method of clause 1, the machine learning model comprising multiple sub-models, each sub-model being configured to: receive a respective subset of the set of samples, the subset of samples representing a respective frequency range of the detected radio frequency signal; and predict whether the radio frequency signal is anomalous in that frequency range; wherein the detected radio frequency signal is predicted as anomalous if the radio frequency signal is predicted as anomalous in at least one of the frequency ranges associated with the multiple sub-models.

Clause 3. The method of clause 2, wherein the detected radio frequency signal is predicted as anomalous if the radio frequency signal is predicted as anomalous in each range of the frequency ranges associated with the multiple sub-models.

Clause 4. The method of any of the preceding clauses 1 to 3, wherein the computer system comprises multiple components, wherein detecting the radio frequency signal comprises: detecting individual radio frequency signals at the components, and combining the individual radio frequency signals to obtain the detected radio frequency signal.

Clause 5. The method of any of the preceding clauses 1 to 4, the radio frequency signal being a wireless radio frequency signal.

Clause 6. The method of any of the preceding clauses 1 to 5, the machine learning model being a classifier, preferably a Support Vector Machine classifier.

Clause 7. The method of any of the preceding clauses 1 to 6, the generating of the alarm signal comprising sending a notification about the detected anomalous radio frequency signal to predefined contact person of the computer system.

Clause 8. The method of any of the preceding clauses 1 to 7, being repeatedly performed.

Clause 9. The method of any of the preceding clauses 1 to 8, the set of samples being time domain samples or frequency domain samples, the frequency domain samples being obtained by a Fourier transformation of the set of time domain samples.

Clause 10. The method of any of the preceding clauses 1 to 9, comprising before performing the method: creating a training dataset, the training dataset comprising entries with sets of samples of training radio frequency signals of the computer system and labels indicating whether the training radio frequency signals are anomalous; training the machine learning model using the training dataset.

Clause 11. The method of clause 10, comprising collecting the training radio frequency signals of the training dataset: during manufacturing of the computer system, and/or during compliance testing of the computer system and/or in-situ after the computer system is installed.

Clause 12. The method of any of the preceding clauses 10 to 11, the computer system comprises multiple components, the method comprising collecting the training radio frequency signals of at least part of the training dataset by at least: detecting individual radio frequency signals at the components, and combining the individual radio frequency signals to obtain the training radio frequency signal.

Clause 13. The method of clause 12, the combining of the individual radio frequency signals comprises averaging or summing the individual radio frequency signals after aligning the individual radio frequency signals in phase.

Clause 14. The method of any of the preceding clauses 10 to 13, comprising collecting the training radio frequency signals of the training dataset using different system configurations of the computer system.

Clause 15. The method of clause 14, the system configuration of the computer system comprising at least one of: a workload level of the computer system; a signal to noise ratio, SNR, level indicating a noise contribution of a noise source of the computer system; a predefined orientation of an antenna that detects the radio frequency signals.

Clause 16. The method of any of the preceding clauses 10 to 15, further comprising updating the training dataset and retraining the machine learning model using the updated training dataset.

Clause 17. The method of clause 16, wherein the retraining is performed in response to at least one of: a change in a configuration of the computer system and/or in an operation of the computer system; or a validity time period is lapsed.

Clause 18. The method of any of the preceding clauses 10 to 17, the samples being time domain samples or frequency domain samples, the frequency domain samples being obtained by a Fourier transformation of the time domain samples.

Clause 19. The method of any of the preceding clauses 10 to 18, wherein the training comprises for each entry of the training dataset: receiving by the machine learning model a set of samples of the training radio frequency signal; and predicting by the machine learning model whether the training radio frequency signal is anomalous; wherein the training is performed to minimize an error between the predictions and the labels associated with the training radio frequency signals.

Clause 20. The method of any of the preceding clauses 10 to 18, the machine learning model comprising multiple sub-models, wherein the training comprises for each entry of the training dataset and for each sub-model: receive at the sub-model a respective subset of a set of samples of the training reference signal, the subset of samples representing a respective frequency range of the training radio frequency signal, and predict by the sub-model whether the training radio frequency signal is anomalous or not anomalous in that frequency range; wherein the training radio frequency signal is predicted as anomalous if the training radio frequency signal is predicted as anomalous in at least one of the frequency ranges associated with the multiple sub-models; wherein the training is performed to minimize an error between the predictions and the labels associated with the training radio frequency signals.

Clause 21. The method of any of the preceding clauses 10 to 20, wherein the training radio frequency signal is obtained by at least: detecting a radio frequency signal in an area of the computer system; and providing the training radio frequency signal as the detected radio frequency signal, or applying a mathematical preconditioner to the detected radio frequency signal to obtain the training radio frequency signal.

Clause 22. A computer program product comprising a computer-readable storage medium having computer-readable program code embodied therewith, the computer-readable program code configured to implement the method of clauses 1 to 21.

Clause 23. A detection system for detecting information breach in a computer system, the detection system comprising a machine learning model, the machine learning model being configured to predict whether a radio frequency signal is anomalous or not anomalous; the detection system being configured to implement the method of clauses 1 to 21.

Clause 24. The detection system of clause 23, comprising a radio frequency detector that is configured to detect the radio frequency signal and to provide the detected radio frequency to an analyser of the detection system, wherein the analyser is configured to perform the receiving, the inputting, the receiving and the generating.

Clause 25. A method of training a machine learning model to predict whether a radio frequency signal is anomalous or not; the method comprising:
creating a training dataset, the training dataset comprising entries, wherein the entry comprises a set of samples of a training radio frequency signal of the computer system and a label indicating whether the training radio frequency signal is anomalous or not;
training the machine learning model using the training dataset.

Computing environment 800 contains an example of an environment for the execution of at least some of the computer code involved in performing the inventive methods, such as code 900 for detecting information breach in a computer system using a machine learning model. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future.

Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open-source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for detecting information breach in a computer system, the method comprising:
    detecting a radio frequency signal in an area of the computer system;
    inputting a set of samples of the radio frequency signal to a machine learning model comprising multiple sub-models, the machine learning model being configured to predict whether a radio frequency signal is anomalous wherein each sub-model being configured to: receive a respective subset of the set of samples, the subset of samples representing a respective frequency range of the detected radio frequency signal; and predict whether the radio frequency signal is anomalous in that frequency range;
    receiving an output of the machine learning model, the output indicating whether the detected radio frequency signal is anomalous, wherein the detected radio frequency signal is predicted as anomalous if the radio frequency signal is predicted as anomalous in each range of the frequency ranges associated with the multiple sub-models; and
    generating an alarm signal in case the detected radio frequency signal is predicted as an anomalous signal.

2. The method of claim 1, wherein the computer system comprises multiple components, wherein detecting the radio frequency signal comprises: detecting individual radio frequency signals at the components, and combining the individual radio frequency signals to obtain the detected radio frequency signal.

3. The method of claim 1, the radio frequency signal being a wireless radio frequency signal.

4. The method of claim 1, the machine learning model being a Support Vector Machine classifier.

5. The method of claim 1, the generating of the alarm signal comprising sending a notification about the detected anomalous radio frequency signal to predefined contact person of the computer system.

6. The method of claim 1, being repeatedly performed.

7. The method of claim 1, the set of samples being time domain samples.

8. The method of claim 1, further comprising:
    creating a training dataset, the training dataset comprising entries with sets of samples of training radio frequency signals of the computer system and labels indicating whether the training radio frequency signals are anomalous; and training the machine learning model using the training dataset.

9. The method of claim 8, comprising collecting the training radio frequency signals of the training dataset: during manufacturing of the computer system, and/or during compliance testing of the computer system and/or in-situ after the computer system is installed.

10. The method of claim 8, the computer system comprising multiple components, the method comprising collecting the training radio frequency signals of the training dataset by at least:
  detecting individual radio frequency signals at the components, and combining the individual radio frequency signals to obtain the training radio frequency signal.

11. The method of claim 10, the combining of the individual radio frequency signals comprises averaging the individual radio frequency signals after aligning the individual radio frequency signals in phase.

12. The method of claim 8, comprising collecting the training radio frequency signals of the training dataset using different system configurations of the computer system.

13. The method of claim 12, the system configuration of the computer system comprising at least one of:
  a workload level of the computer system;
  a signal to noise ratio, SNR, level indicating a noise contribution of a noise source of the computer system; and
  a predefined orientation of an antenna that detects the radio frequency signals.

14. The method of claim 8, further comprising updating the training dataset and retraining the machine learning model using the updated training dataset.

15. The method of claim 14, wherein the retraining is performed in response to at least one of:
  a change in a configuration of the computer system and in an operation of the computer system; and
  a validity time period is lapsed.

16. The method of claim 8, the samples being frequency domain samples.

17. The method of claim 8, wherein the training comprises for each entry of the training dataset:
  receiving by the machine learning model a set of samples of the training radio frequency signal; and
  predicting by the machine learning model whether the training radio frequency signal is anomalous;
  wherein the training is performed to minimize an error between the predictions and the labels associated with the training radio frequency signals.

18. The method of claim 8, the machine learning model comprising multiple sub-models, wherein the training comprises for each entry of the training dataset and for each sub-model:
  receive at the sub-model a respective subset of a set of samples of the training radio frequency, the subset of samples representing a respective frequency range of the training radio frequency signal, and
  predict by the sub-model whether the training radio frequency signal is anomalous or not anomalous in that frequency range;
  wherein the training radio frequency signal is predicted as anomalous if the training radio frequency signal is predicted as anomalous in at least one of the frequency ranges associated with the multiple sub-models;
  wherein the training is performed to minimize an error between the predictions and the labels associated with the training radio frequency signals.

19. The method of claim 8, wherein the training radio frequency signal is obtained by at least:
  detecting a radio frequency signal in an area of the computer system; and
  providing the training radio frequency signal as the detected radio frequency signal.

20. A computer program product comprising a computer-readable storage medium having computer-readable program code embodied therewith, the computer-readable program code configured to implement, a method comprising:
  detecting a radio frequency signal in an area of a computer system;
  inputting a set of samples of the radio frequency signal to a machine learning model comprising multiple sub-models, the machine learning model being configured to predict whether a radio frequency signal is anomalous, wherein each sub-model being configured to: receive a respective subset of the set of samples, the subset of samples representing a respective frequency range of the detected radio frequency signal; and predict whether the radio frequency signal is anomalous in that frequency range;
  receiving an output of the machine learning model, the output indicating whether the detected radio frequency signal is anomalous, wherein the detected radio frequency signal is predicted as anomalous if the radio frequency signal is predicted as anomalous in each range of the frequency ranges associated with the multiple sub-models; and
  generating an alarm signal in case the detected radio frequency signal is predicted as an anomalous signal.

21. A detection system comprising a computer-readable storage medium having a computer-readable program code embodied therewith, the computer-readable program code configured to implement detecting information breach in a computer system, the detection system comprising a machine learning model comprising multiple sub-models, the machine learning model being configured to predict whether a radio frequency signal is anomalous or not anomalous; the detection system being configured for:
  receiving a radio frequency signal in an area of the computer system;
  inputting a set of samples of the radio frequency signal to the machine learning model, wherein each sub-model being configured to: receive a respective subset of the set of samples, the subset of samples representing a respective frequency range of the detected radio frequency signal; and predict whether the radio frequency signal is anomalous in that frequency range;
  receiving an output of the machine learning model, the output indicating that the received radio frequency signal is anomalous or not, wherein the detected radio frequency signal is predicted as anomalous if the radio frequency signal is predicted as anomalous in each range of the frequency ranges associated with the multiple sub-models; and
  generating an alarm signal in case the received radio frequency signal is an anomalous signal.

22. The detection system of claim 21, comprising a radio frequency detector that is configured to detect the radio frequency signal and to provide the detected radio frequency to an analyzer of the detection system, wherein the analyzer is configured to perform the receiving, the inputting, the receiving and the generating.

23. A method of training a machine learning model to predict whether a radio frequency signal is anomalous or not, the method comprising:

creating a training dataset, the training dataset comprising entries, wherein a first entry comprises a set of samples of a training radio frequency signal of a computer system and a label indicating whether the training radio frequency signal is anomalous or not;

training the machine learning model using the training dataset;

detecting a radio frequency signal in an area of the computer system;

inputting a set of samples of the radio frequency signal to a machine learning model comprising multiple sub-models, the machine learning model being configured to predict whether a radio frequency signal is anomalous wherein each sub-model being configured to: receive a respective subset of the set of samples, the subset of samples representing a respective frequency range of the detected radio frequency signal; and predict whether the radio frequency signal is anomalous in that frequency range;

receiving an output of the machine learning model, the output indicating whether the detected radio frequency signal is anomalous, wherein the detected radio frequency signal is predicted as anomalous if the radio frequency signal is predicted as anomalous in each range of the frequency ranges associated with the multiple sub-models; and generating an alarm signal in case the detected radio frequency signal is predicted as an anomalous signal.

* * * * *